(12) United States Patent
Matsuda et al.

(10) Patent No.: US 11,781,640 B2
(45) Date of Patent: Oct. 10, 2023

(54) DRIVE DEVICE

(71) Applicant: NISSAN MOTOR CO., LTD., Yokohama (JP)

(72) Inventors: Yusuke Matsuda, Kanagawa (JP); Takehito Harata, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/924,713

(22) PCT Filed: May 12, 2020

(86) PCT No.: PCT/JP2020/019027
§ 371 (c)(1),
(2) Date: Nov. 11, 2022

(87) PCT Pub. No.: WO2021/229697
PCT Pub. Date: Nov. 18, 2021

(65) Prior Publication Data
US 2023/0184322 A1 Jun. 15, 2023

(51) Int. Cl.
*F16H 57/04* (2010.01)
(52) U.S. Cl.
CPC ....... *F16H 57/0424* (2013.01); *F16H 57/045* (2013.01); *F16H 57/0412* (2013.01); *F16H 57/0457* (2013.01); *F16H 57/0476* (2013.01)
(58) Field of Classification Search
CPC ............. F16H 57/0412; F16H 57/0421; F16H 57/0424; F16H 57/045; F16H 57/0457; F16H 57/0476
See application file for complete search history.

(56) References Cited

U.S. PATENT DOCUMENTS

| 7,834,492 | B2 * | 11/2010 | Iund | H02K 9/19 |
| | | | | 310/58 |
| 10,525,810 | B2 * | 1/2020 | Jegebris | B60K 1/00 |
| 10,630,140 | B2 * | 4/2020 | Pritchard | B60K 17/046 |
| 2014/0054114 | A1 | 2/2014 | Isomura et al. | |
| 2017/0307055 | A1 * | 10/2017 | Scharr | B60K 17/046 |
| 2023/0044631 | A1 * | 2/2023 | Yasui | F16H 57/0415 |
| 2023/0045442 | A1 * | 2/2023 | Oshidari | F16H 48/10 |
| 2023/0050981 | A1 * | 2/2023 | Suzuki | F16H 57/0424 |
| 2023/0051028 | A1 * | 2/2023 | Yasui | F16H 57/0486 |
| 2023/0074168 | A1 * | 3/2023 | Yasui | F16H 57/0423 |

FOREIGN PATENT DOCUMENTS

| CN | 111740532 | A | * | 10/2020 |
| DE | 754588 | C | * | 5/1951 |
| EP | 0990820 | A2 | * | 4/2000 |
| EP | 3 534 042 | A1 | | 9/2019 |
| JP | 5075878 | B2 | | 11/2012 |
| JP | 2018-059577 | A | | 4/2018 |
| WO | WO-2012/144035 | A1 | | 10/2012 |

* cited by examiner

*Primary Examiner* — Adam D Rogers
(74) *Attorney, Agent, or Firm* — Foley & Lardner LLP

(57) ABSTRACT

A drive device includes a housing, and a rotary electric machine and a transmission housed in the housing. A lubricating oil for lubricating a gear of the transmission is stored in a bottom portion of the housing. The housing includes a refrigerant passage through which a refrigerant for cooling the rotary electric machine flows, and a storage portion adjacent to the refrigerant passage and configured to temporarily store the lubricating oil scooped up by the gear of the transmission.

5 Claims, 7 Drawing Sheets

DRIVE DEVICE

TECHNICAL FIELD

The present invention relates to a drive device.

BACKGROUND ART

In speed reducers used in electric vehicles, hybrid vehicles, and the like, lubricating oils for lubrication and cooling are used.

JP 2018-59577A discloses a power transmission device in which a heat exchanger including a U-shaped pipe through which cooling water flows is disposed in a transmission (speed reducer), and heat exchange is performed between a lubricating oil and the cooling water.

SUMMARY OF INVENTION

When a heat exchanger is provided in the speed reducer as in the related art, the structure is complicated. In addition, an increase in the number of components leads to an increase in a size of a configuration of the speed reducer and an increase in weight.

The present invention has been made in view of such a problem, and an object of the present invention is to provide a drive device in which a lubricating oil can be cooled without increasing the number of components of a speed reducer.

According to an aspect of the present invention, a drive device includes a housing, and a rotary electric machine and a transmission housed in the housing. A lubricating oil for lubricating a gear of the transmission is stored in a bottom portion of the housing. The housing includes a refrigerant passage through which a refrigerant for cooling the rotary electric machine flows, and a storage portion adjacent to the refrigerant passage and configured to temporarily store the lubricating oil scooped up by the gear of the transmission.

According to the present invention, since a storage portion for temporarily storing a lubricating oil is provided adjacent to a refrigerant passage of a rotary electric machine, the lubricating oil can be cooled without increasing the number of components of the speed reducer.

DESCRIPTION OF EMBODIMENTS

Hereinafter, embodiments of the present invention will be described with reference to the drawings and the like.

Figure 1:
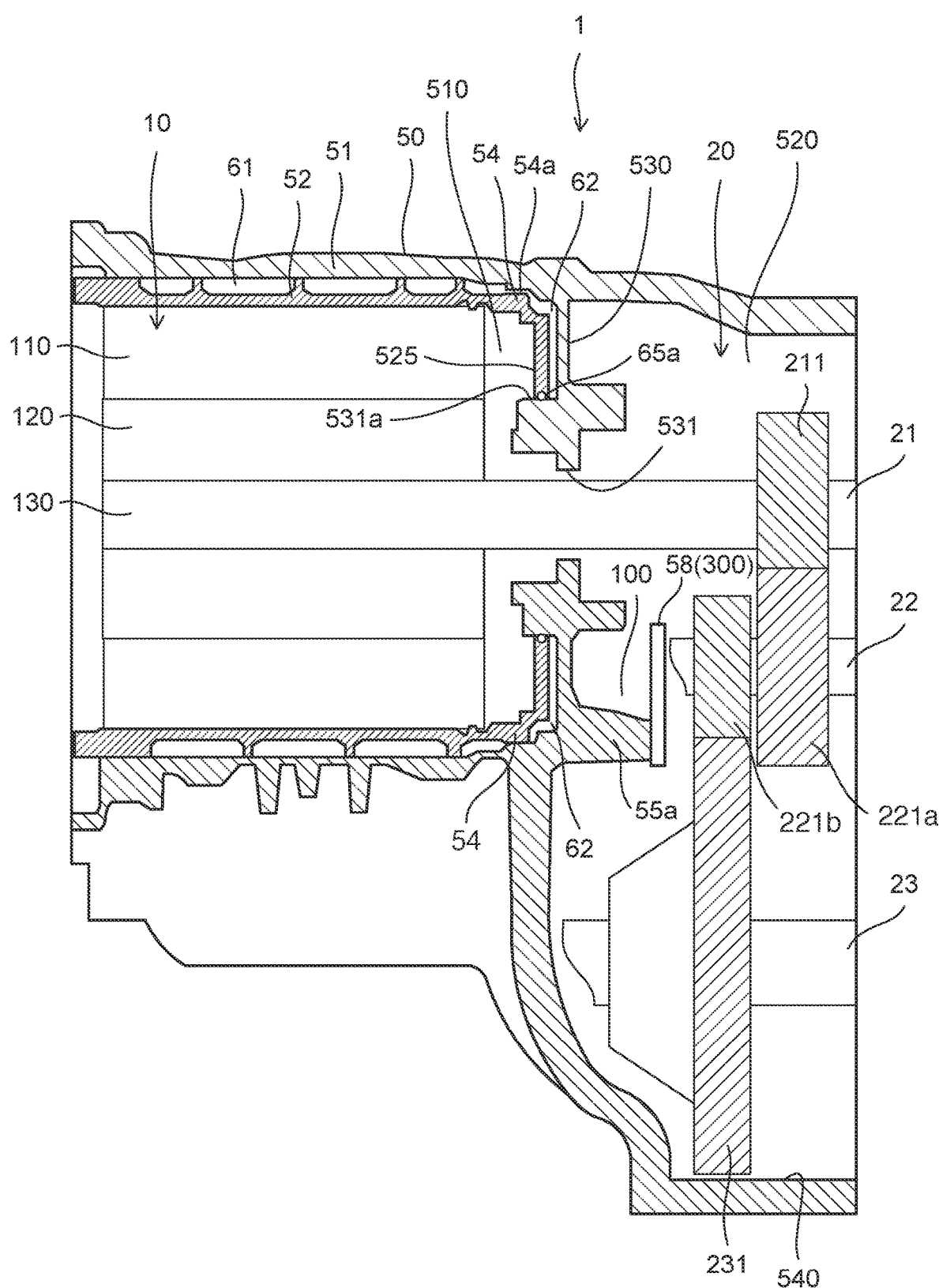
FIG. 1 is a longitudinal sectional view of a drive device for vehicle according to a first embodiment of the present invention.

FIG. 1 is a longitudinal sectional view of a drive device 1 for vehicle according to the present embodiment.

The drive device 1 includes a motor 10 as a rotary electric machine, and a speed reducer 20 that reduces a speed of rotation of the motor 10 and transmits the rotation to a drive wheel that is not shown. The motor 10 and the speed reducer 20 are housed in a housing 50.

The motor 10 includes a stator 110, a rotor 120, and a rotor shaft 130, and rotates by being supplied with electric power from a battery that is not shown. The motor 10 also functions as a power generator that generates (regenerates) electric power by receiving a driving force generated by the rotation of the drive wheel. The motor 10 may be used as a drive device for a device other than a vehicle, for example, various electric devices or industrial machines.

The speed reducer 20 is a transmission device including a plurality of gears. The speed reducer 20 reduces the speed of the rotation input from the motor 10 and transmits the rotation to the drive wheel.

The housing 50 includes an outer housing 51 and an inner housing 52 provided inside the outer housing 51.

A motor chamber (rotary electric machine chamber) 510 in which the motor 10 is housed and a speed reducer chamber (transmission chamber) 520 in which the speed reducer 20 is housed are provided on an inner periphery side of the outer housing 51. A partition wall portion 530 is formed between the motor chamber 510 and the speed reducer chamber 520 to separate the motor chamber 510 and the speed reducer chamber 520. A through hole 531 through which the rotor shaft 130 of the motor 10 passes is formed in the partition wall portion 530.

The motor chamber 510 of the outer housing 51 is a cylindrical space, and the inner housing 52 is mounted on an inner periphery side of the motor chamber 510. The motor 10 is provided inside the inner housing 52.

Projections and recesses are formed on an outer periphery of the inner housing 52. The projections of the outer periphery of the inner housing 52 are in close contact with the inner periphery of the outer housing 51, and thus the inner housing 52 is fixed to the outer housing 51. The recess shape of the outer periphery of the forms a space between the inner housing 52 and the inner periphery of the outer housing 51. This space is configured as a refrigerant passage (first refrigerant passage 61) through which a refrigerant (coolant) for cooling the motor 10 flows.

A wall portion 525 extending along an inner periphery side so as to face the partition wall portion 530 is formed in a portion of the inner housing 52 facing the partition wall portion 530. A cylindrical flange portion 531a protruding from the through hole 531 of the partition wall portion 530 is circumscribed by an inner periphery portion (opening portion) of the wall portion 525 of the inner housing 52. A seal member 65a for preventing a refrigerant leakage is provided at the inner periphery portion of the wall portion 525. A fixing portion 54 extending along an outer periphery surface of the inner housing 52 is formed in a vicinity of the partition wall portion 530 and on the outer periphery side of the wall portion 525. The fixing portion 54 is configured as a projection shape that is into close contact with the inner periphery of the outer housing 51, and fixes the inner housing 52 to the inner periphery of the outer housing 51.

Figure 2:
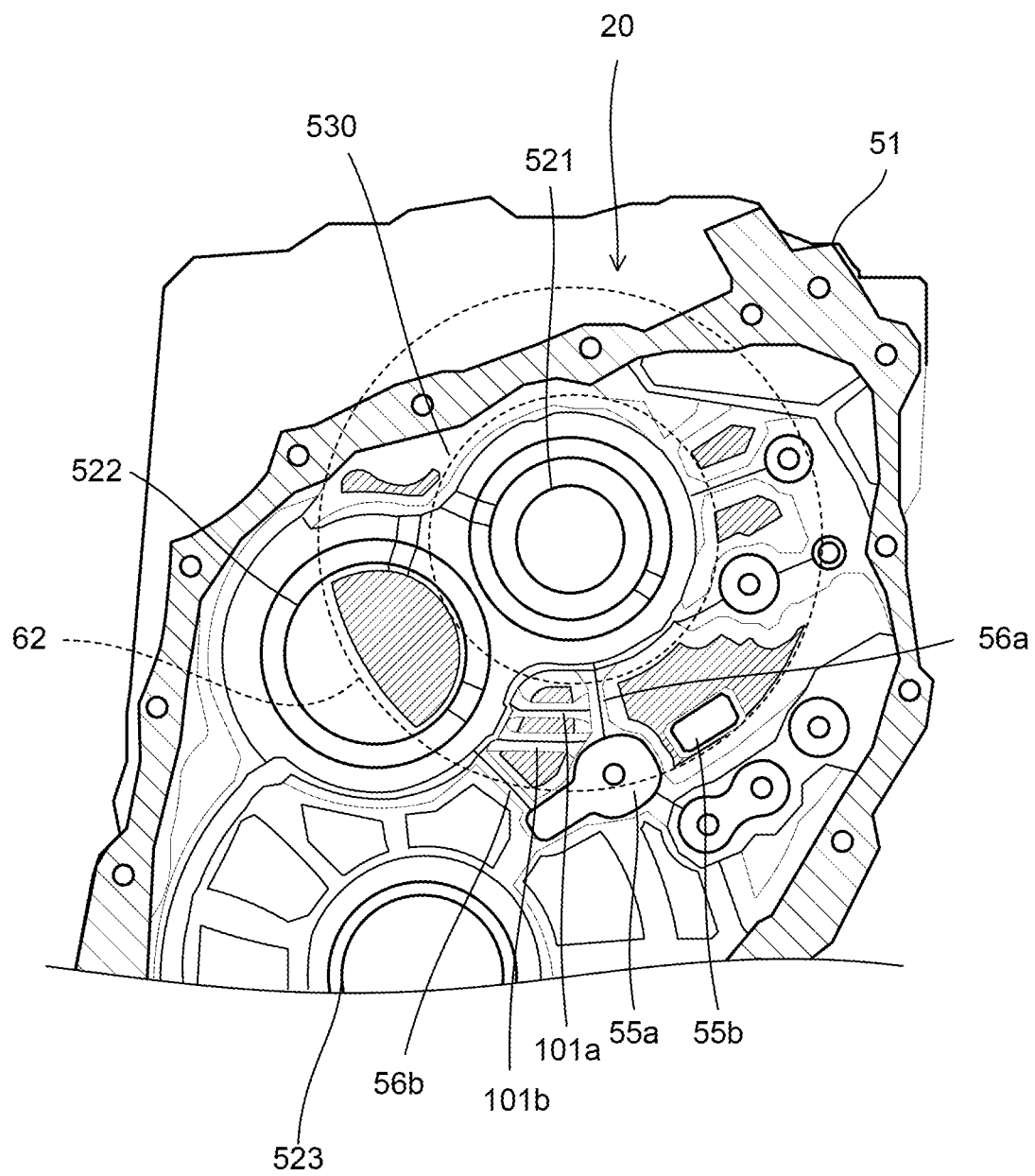
FIG. 2 is a view of a speed reducer as viewed toward a partition wall portion of an outer housing.

With such a configuration, a space surrounded by the wall portion 525 and the fixing portion 54 of the inner housing 52 and the partition wall portion 530 of the outer housing 51 is configured as a refrigerant passage (second refrigerant passage 62) through which a refrigerant (coolant) flows (indicated by a dotted line in FIG. 2). In the fixing portion 54, communication holes 54*a* (for example, four communication holes) that allow the first refrigerant passage 61 to communicate with the second refrigerant passage 62 are opened at predetermined intervals in a peripheral direction.

The motor 10 is cooled by the refrigerant flowing through the first refrigerant passage 61 formed on an outer side in the peripheral direction of the motor 10 and the second refrigerant passage 62 formed on a partition wall portion 530 side.

The speed reducer 20 includes three shafts (a first shaft 21, a second shaft 22, and a third shaft 23) and gears fixed to the three shafts, respectively.

A first gear 211 is fixed on the first shaft 21. The first shaft 21 is coupled to the rotor shaft 130 of the motor 10 and rotates together with the rotor 120 of the motor 10. The second shaft 22 is located below the first shaft 21, and two second gears 221*a* and 221*b* are fixed on the second shaft 22. The third shaft 23 is located below the second shaft 22 and a final gear 231 is fixed on the third shaft 23. A differential device is provided on the final gear 231. The third shaft 23 is configured as an axle and is coupled to the drive wheel. The second gear 221*a* meshes with the first gear 211 on the first shaft 21, and the second gear 221*b* meshes with the final gear 231 of the third shaft 23. Thus, the rotation of the first shaft 21 is transmitted to the third shaft 23.

The first shaft 21, the second shaft 22, and the third shaft 23 are rotatably supported on an inner wall of the outer housing 51 by bearings that are not shown.

With such a configuration, the rotation of the motor 10 is transmitted to the drive wheel by the speed reducer 20, and the vehicle travels.

In the present embodiment, an example in which the speed reducer 20 decelerates the motor 10 by four gears has been described, and the number and configuration of the gears are not limited thereto. The speed reducer 20 may be configured as a transmission as long as the speed reducer 20 changes the speed of the rotation.

FIG. 2 is a view of the partition wall portion 530 as viewed from a speed reducer 20 side.

The partition wall portion 530 includes a first bearing portion 521 that supports the first shaft 21, a second bearing portion 522 that supports the second shaft 22, and a third bearing portion 523 that supports the third shaft 23.

Each of these bearing portions is formed upright from the partition wall portion 530 in a cylindrical shape. A plurality of ribs for reinforcement are provided around each of these bearing portions.

Next, a lubricating oil in the speed reducer 20 will be described.

In the speed reducer 20, the plurality of gears are lubricated by the lubricating oil. The lubricating oil is stored in a bottom portion of the speed reducer 20, that is, in a lower portion of the speed reducer chamber 520 in the housing 50. That is, the bottom portion is configured as an oil pan 540 (see FIG. 1).

When a vehicle is traveling, the lubricating oil is scooped up by the final gear 231. Thereafter, the lubricating oil is guided to the second gears 221*a* and 221*b* and the first gear 211. In this way, the lubricating oil is transmitted to tooth surfaces of the gears to lubricate the gears. Thereafter, the lubricating oil flows downward due to gravity.

Cooling of the lubricating oil in the speed reducer 20 configured as described above will be described.

In the related art, in order to cool the lubricating oil in the speed reducer 20, there has been a method in which an oil cooler is provided outside the speed reducer 20, or a cooling water passage through which a refrigerant for cooling a motor flows is provided inside the speed reducer 20.

On the other hand, when such a cooling configuration is provided, the structure is complicated and the number of components increases, so that the configuration of the speed reducer increases in size and the weight also increases. Further, a pipe through which the lubricating oil circulates to the outside of the speed reducer 20 and a pipe through which the cooling water circulates to the inside of the speed reducer 20 require an oil seal, which complicates the structure and reduces the maintainability.

Therefore, the present embodiment is configured to cool the lubricating oil in the speed reducer 20 by the following configuration.

Figure 3:
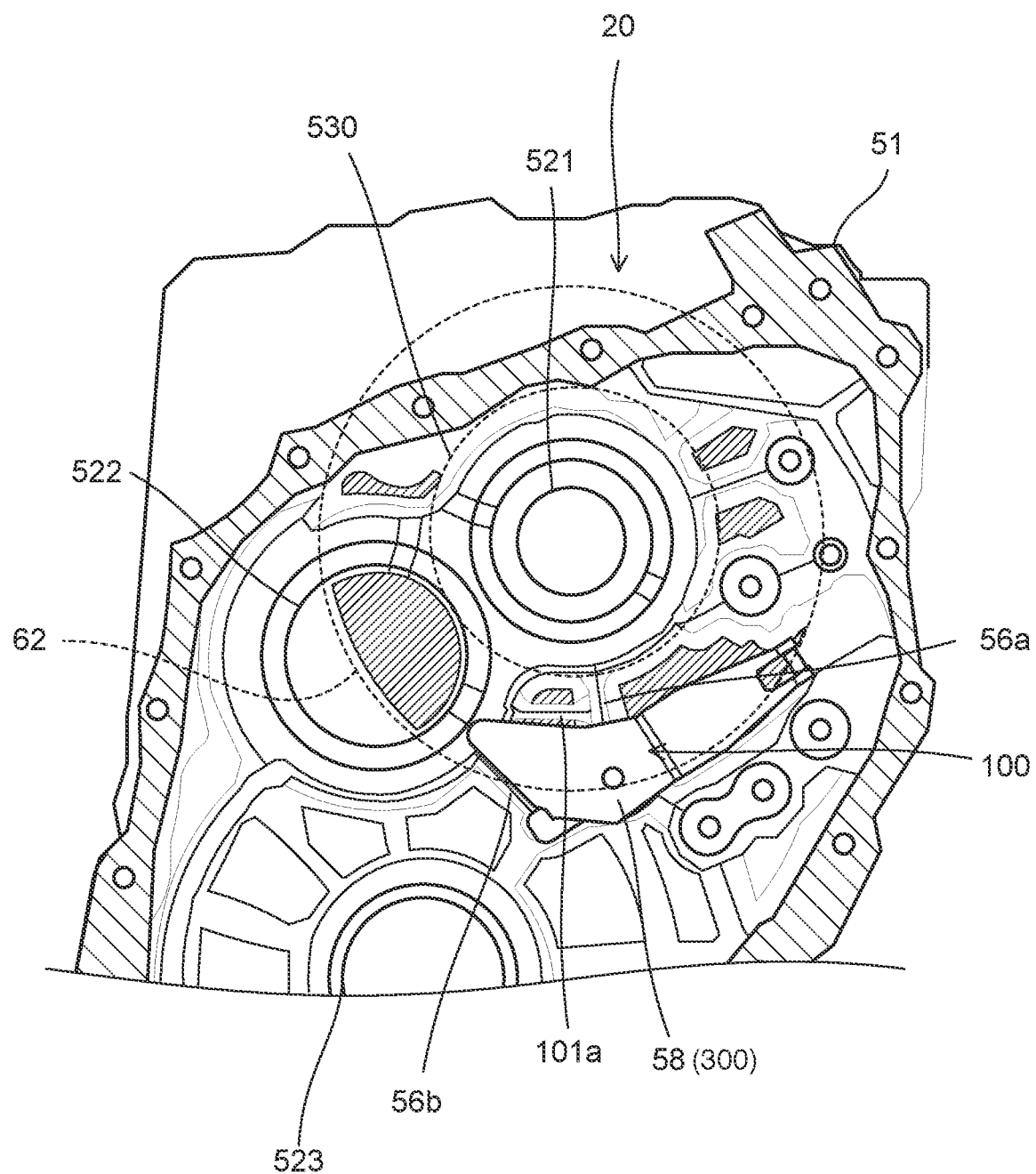
FIG. 3 is a view of the speed reducer as viewed toward the partition wall portion of the outer housing.

FIG. 3 is a view of the partition wall portion 530 as viewed from the speed reducer 20 side, and is a view illustrating a storage portion 100.

In the present embodiment, the storage portion (storage tank) 100 that temporarily stores the lubricating oil flowing down from above is provided on the speed reducer 20 side of the partition wall portion 530.

The storage portion 100 is located between the first bearing portion 521, the second bearing portion 522, and the third bearing portion 523 of the partition wall portion 530. At this position, the storage portion 100 includes a portion formed upright from the partition wall portion 530, and a detent spring 58 attached to this portion.

The detent spring 58 constitutes a component that is a part of a park mechanism 300 provided in the speed reducer 20. The park mechanism includes a cam member that stops (controls) the rotation (the movement) of the speed reducer 20. The detent spring 58 is configured as a thin plate-shaped plate spring that applies a biasing force to the cam member.

A plurality of projections are formed upright on a surface of the partition wall portion 530. Ribs 56*a* and 56*b* are configured to reinforce the partition wall portion 530. A protruding portion 55*a* is configured to fix the detent spring 58.

By fixing the detent spring 58 to the protruding portion 55*a*, as shown in FIG. 1, a region surrounded by protruding portions 55*a*, 55*b* and the ribs 56*a*, 56*b* is formed between the partition wall portion 530 and the detent spring 58 facing the partition wall portion 530. This region functions as the storage portion 100 that temporarily stores the lubricating oil when the lubricating oil scooped upward by the gear flows down.

The second refrigerant passage 62 (indicated by a dotted line in FIG. 3) is provided on a motor chamber 510 side of the partition wall portion 530. That is, the storage portion 100 on a speed reducer chamber 520 side of the partition wall portion 530 is disposed adjacent to the second refrigerant passage 62 provided on the motor chamber 510 side with the partition wall portion 530 interposed therebetween. In particular, a thin plate portion of the partition wall portion 530, that is, a portion (indicated by hatching in FIG. 3) on which no protruding structure, such as a protruding portion, a rib, or a bearing portion is provided, is more adjacent to the second refrigerant passage 62.

Therefore, the storage portion 100 that temporarily stores the lubricating oil in the speed reducer 20 is disposed adjacent to the second refrigerant passage 62 through which the refrigerant of the motor 10 flows, so that the lubricating oil is cooled by the refrigerant. The lubricating oil stored in the storage portion 100 then passes through a gap or the like existing between the detent spring 58 and the partition wall portion 530, and flows down to a lower side of the speed reducer chamber 520.

In the present embodiment, a partition plate is provided around each of the gears in order to guide the lubricating oil in the speed reducer 20 to the storage portion 100.

Figure 4:
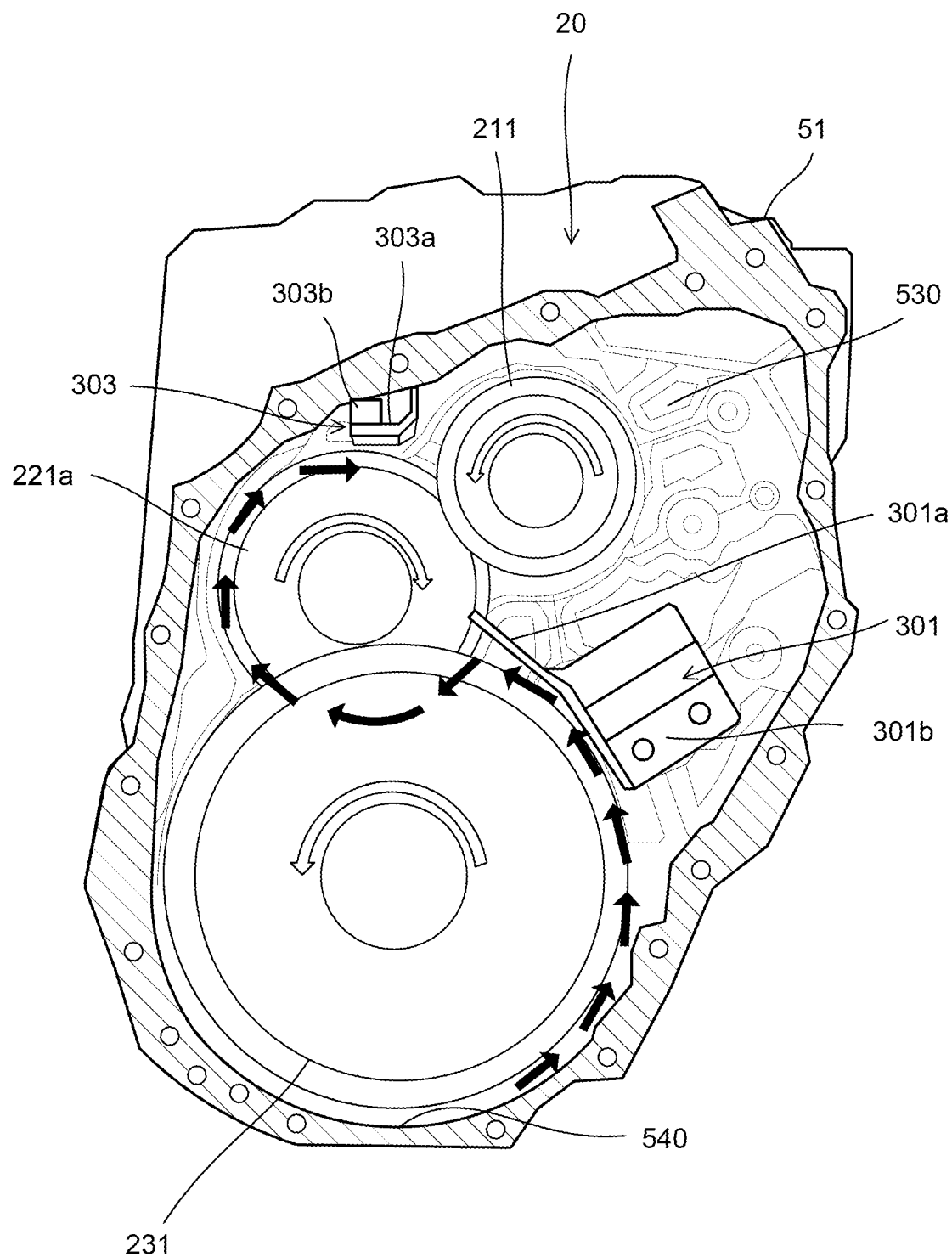
FIG. 4 is a view of the speed reducer as viewed toward the partition wall portion.
Figure 5:
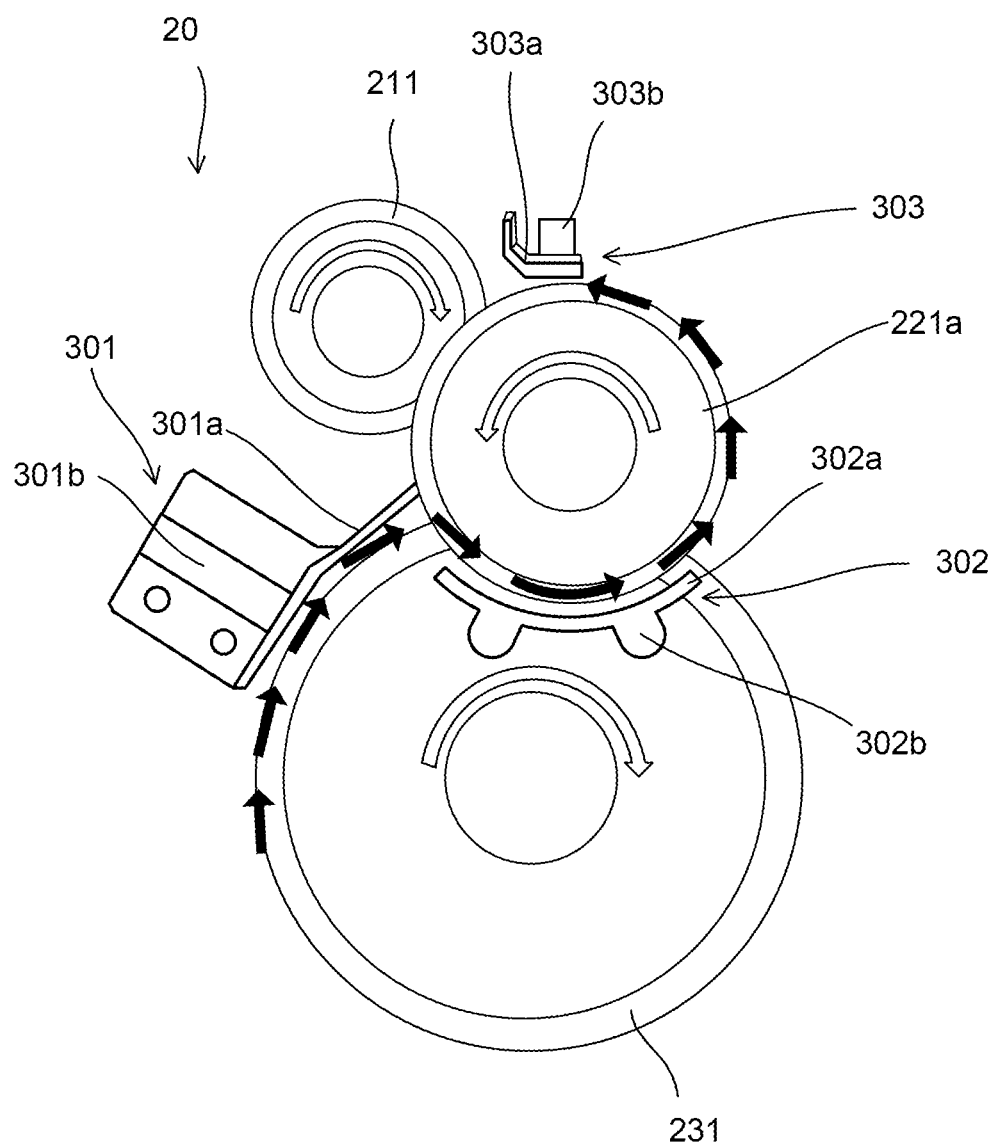
FIG. 5 is a view of the speed reducer as viewed from the partition wall portion side.

FIGS. 4 and 5 are views illustrating the partition plates of the speed reducer 20. FIG. 4 is a view illustrating configurations of the gears of the speed reducer 20, and FIG. 5 is a view of the gears of the speed reducer 20 as viewed from a motor 10 side.

A first partition plate 301 is provided on a radially outer side diagonally above the final gear 231. The first partition plate 301 has a flat surface on the outer side of the final gear 231, and includes a partition portion 301a and a fixing portion 301b that prevent the lubricating oil from scattering and guide the lubricating oil in a rotation direction of the gear.

Referring to FIG. 5, a second partition plate 302 is provided on a radially outer side downward of the second gear 221a. The second partition plate 302 has a circumferential surface along the periphery of the second gear 221a, and includes a partition portion 302a and a fixing portion 302b that prevent the lubricating oil from scattering and guide the lubricating oil in a rotation direction of the gear.

Referring to FIG. 4, a third partition plate 303 is provided on the radially outer side above the second gear. The third partition plate 303 has a plate-shaped surface inclined toward an isolation wall side, and includes a partition portion 303a and a fixing portion 303b that guide the lubricating oil to the partition wall portion 530.

Thus, by providing the partition plates, the lubricating oil is guided to the storage portion 100 as follows. First, as shown in FIG. 4, when the final gear 231 rotates in a counterclockwise direction (indicated by a white arrow in the drawing), the lubricating oil stored in the bottom portion of the speed reducer chamber 520 is scooped up in the counterclockwise direction along with the rotation of the final gear 231.

The first partition plate 301 is provided diagonally above the final gear 231. The first partition plate 301 receives the lubricating oil and returns the lubricating oil to the teeth of the final gear 231. Thus, the lubricating oil is transmitted from teeth of the final gear 231 to teeth of the second gear 221 without being scattered due to a centrifugal force.

As shown in FIG. 5, the second partition plate 302 having a circumferential shape is provided on a lower side of the second gear 221a. The second partition plate 302 receives the lubricating oil on the second gear 221a so as not to flow down, and returns the lubricating oil to the teeth of the second gear 221. Thus, when the second gear 221 rotates (indicated by a white arrow in the drawing), the lubricating oil that is about to fall due to gravity is scooped up to an upper side of the second gear 221a.

The third partition plate 303 is provided on the upper side of the second gear. The third partition plate 303 is configured to be inclined downward toward the partition wall portion 530. Thus, the lubricating oil fed upward by the rotation of the second gear 221 adheres to a surface of the partition portion 303a of the third partition plate 303 due to the centrifugal force, and is then transmitted to the surface of the partition wall portion 530 according to the inclination of the partition portion 303a.

The lubricating oil flows downward along the surface of the partition wall portion 530. That is, the lubricating oil flows further down while flowing down around the first bearing portion 521 and the second bearing portion 522 on the surface of the partition wall portion 530. As shown in FIG. 2, since the ribs 56a and 56b are formed in a longitudinal direction (vertical direction) on the partition wall portion 530 side of the storage portion 100, the lubricating oil flowing down from above is guided to the storage portion 100 and stored in the storage portion 100.

The storage portion 100 is adjacent to the second refrigerant passage 62 with the partition wall portion 530 interposed therebetween. Therefore, while the lubricating oil remains in the storage portion 100, the lubricating oil is cooled by the refrigerant in the second refrigerant passage 62. Further, since ribs 101a and 101b in a lateral direction (horizontal direction) are formed on the partition wall portion 530 side of the storage portion 100, a surface area on the partition wall portion 530 side increases. Therefore, cooling of the lubricating oil by the refrigerant is promoted.

Thereafter, the lubricating oil stored in the storage portion 100 passes through the gap or the like existing between the detent spring 58 and the partition wall portion 530, and flows down to the lower side of the speed reducer chamber 520.

As described above, the drive device 1 of the first embodiment of the present invention includes the housing 50 in which a lubricating oil in the speed reducer 20 is stored at a bottom portion (oil pan 540), and a rotary electric machine (motor 10) and a transmission (speed reducer 20) housed in the housing 50. The housing 50 includes a refrigerant passage (second refrigerant passage 62) through which a refrigerant for cooling the motor 10 flows, and the storage portion 100 that is adjacent to the second refrigerant passage 62 and temporarily stores the lubricating oil scooped up by gears (first gear 211, second gear 221, and final gear 231) of the speed reducer 20.

In this way, since the storage portion 100 is provided adjacent to the second refrigerant passage 62 that cools the motor 10, it is possible to cool the lubricating oil without newly adding a complicated configuration such as a heat exchanger in the speed reducer 20. Therefore, since the lubricating oil can be cooled without increasing the number of components of the speed reducer 20, it is possible to prevent an increase in the size and weight of the configuration of the speed reducer 20.

Further, by temporarily storing the lubricating oil in the storage portion 100 during traveling, an oil level at the bottom portion (oil pan 540) of the speed reducer chamber 520 can be lowered. Thus, since a resistance to scooping up the lubricating oil can be reduced, and the heat generation of the lubricating oil is also reduced, the cooling of the lubricating oil is promoted.

In the present embodiment, the housing 50 includes the outer housing 51 having a cylindrical space therein, and the inner housing 52 provided inside the outer housing 51. The outer housing 51 includes the partition wall portion 530 that separates the motor chamber 510 in which the motor 10 is housed and the speed reducer chamber 520 in which the speed reducer 20 is housed, and the inner housing 52 is housed in the motor chamber 510. The second refrigerant passage 62 is formed between the partition wall portion 530 of the outer housing 51 and the inner housing 52, and the second refrigerant passage 62 and the storage portion 100 face each other with the partition wall portion 530 interposed therebetween.

With such a configuration, since the second refrigerant passage 62 and the storage portion 100 face each other with the partition wall portion 530 interposed therebetween, the lubricating oil is appropriately cooled.

In the present embodiment, the inner housing 52 is fixed by the fixing portion 54 inscribed in the outer housing 51 in the vicinity of the partition wall portion 530 of the outer housing 51, the first refrigerant passage 61 is formed between the inner periphery of the motor chamber 510 of the outer housing 51 and the inner housing 52, and the second refrigerant passage 62 is formed between the partition wall portion 530 of the outer housing 51 on the motor chamber 510 side and the inner housing 52. The first refrigerant passage 61 and the second refrigerant passage 62 communicate with each other through the communication holes 54a formed in the fixing portion 54.

With such a configuration, the first refrigerant passage 61 and the second refrigerant passage 62 communicate with each other through the communication holes 54a, so that the refrigerant can be circulated between the motor 10 side and the partition wall portion 530 side.

In the present embodiment, a park mechanism for stopping the rotation of the speed reducer 20 is provided, and the storage portion 100 is formed by a region defined by the partition wall portion 530 and a component (detent spring 58) that is a part of the park mechanism fixed to the partition wall portion 530. Thus, the storage portion 100 can be formed without newly adding components.

In the present embodiment, in the speed reducer chamber 520 of the housing 50, partition plates (first partition plate 301, second partition plate 302, and third partition plate 303) that guide the lubricating oil scooped up by the gears are provided on radially outer sides of the gears.

Thus, the lubricating oil scooped up by the gears can be guided to the storage portion 100.

In the present embodiment, since the partition wall portion 530 is provided with the ribs 56a and 56b formed upright from the partition wall portion 530, the lubricating oil in the speed reducer flowing downward can be guided to the storage portion 100 by the ribs 56a and 56b.

Next, the drive device 1 according to a second embodiment of the present disclosure will be described.

Figure 6:
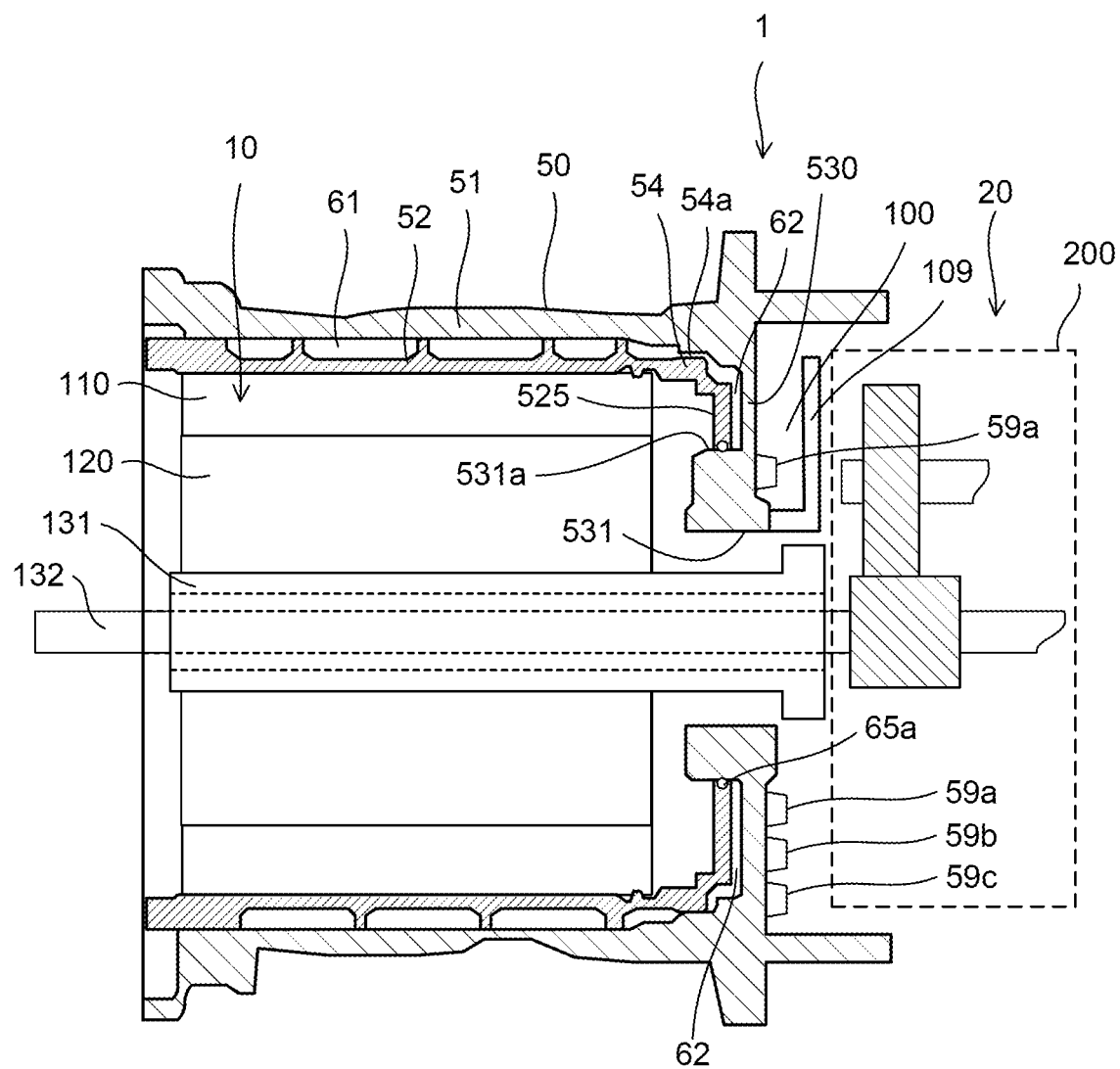
FIG. 6 is a longitudinal sectional view of a drive device for vehicle according to a second embodiment of the present invention.
Figure 7:
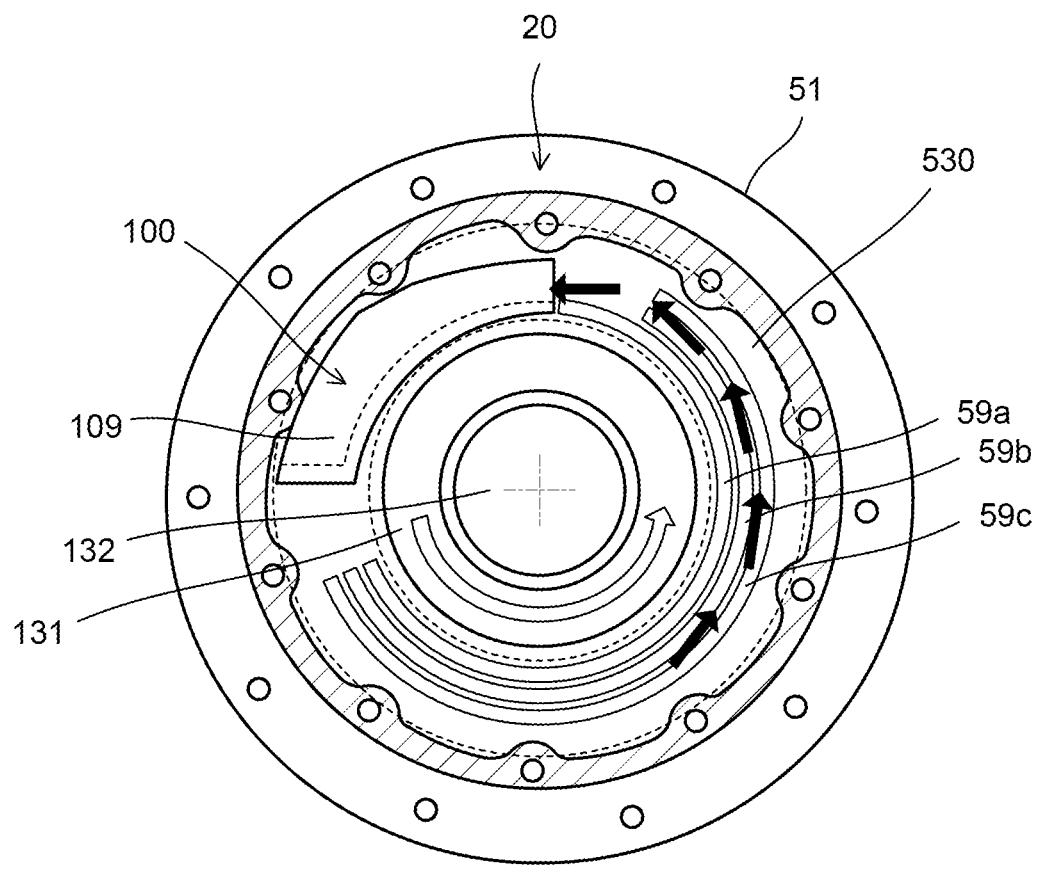
FIG. 7 is a view of the speed reducer according to the second embodiment of the present invention as viewed toward a partition wall portion of an outer housing.

FIGS. 6 and 7 are views illustrating the drive device 1 according to the second embodiment of the present invention.

FIG. 7 is a longitudinal sectional view of the drive device 1. FIG. 7 is a view illustrating the speed reducer 20 as observed toward the partition wall portion 530 of the outer housing 51.

The second embodiment is different from the first embodiment in the configuration of the speed reducer. The same components as those of the first embodiment are denoted by the same reference numerals, and the description thereof will be omitted.

In the second embodiment, a rotor shaft 131 of the motor 10 is formed as a hollow shaft. An axle 132 passes through an inner periphery of the rotor shaft 131.

The speed reducer 20 includes a planetary gear mechanism 200. The planetary gear mechanism 200 decelerates the rotation of the rotor shaft 131 and transmits the rotation to the axle 132. The planetary gear mechanism 200 is provided with a differential device that is not shown.

As shown in FIG. 7, a plurality of ribs (ribs 59a, 59b, and 59c) having a semi-circumferential shape are concentrically and vertically provided on the partition wall portion 530 of the housing 50.

The partition wall portion 530 is provided with a plate 109 having an L-shaped cross section on an upper left side of the rotor shaft 131, and the storage portion 100 is formed by a region defined by the plate 109 and the partition wall portion 530.

In the second embodiment configured as described above, the same operation and effect as those of the first embodiment are also obtained.

That is, as shown in FIG. 7, when the planetary gear mechanism 200 rotates in the counterclockwise direction (indicated by a white arrow in the drawing), the lubricating oil in the oil pan 540, which is the bottom portion of the speed reducer chamber 520, is scooped up. At this time, the lubricating oil enters a gap between the ribs 59a, 59b, and 59c vertically formed in a semi-circumferential shape, and is transmitted in the counterclockwise direction through the gap of the partition wall portion 530 as the planetary gear mechanism 200 rotates (indicated by the arrow in the drawing).

The lubricating oil fed upward is transmitted onto the surface of the partition wall portion 530 and flows down to the storage portion 100. As shown in FIG. 1, the second refrigerant passage 62 is formed on back surfaces of the ribs 59a, 59b, and 59c and a back surface of the storage portion 100. Therefore, the lubricating oil transmitted to the surface of the partition wall portion 530 and the lubricating oil temporarily stored in the storage portion 100 are cooled by the refrigerant.

Thereafter, the lubricating oil stored in the storage portion 100 passes through a gap or the like existing between the plate 109 and the partition wall portion 530, and flows down to the lower side of the speed reducer chamber 520.

As described above, in a case in which a speed reduction mechanism is implemented by the single-shaft planetary gear mechanism 200 as in the second embodiment, similarly to the first embodiment, it is also possible to appropriately cool the lubricating oil without newly adding a complicated configuration such as a heat exchanger in the speed reducer 20. Therefore, since the lubricating oil can be cooled without increasing the number of components of the speed reducer 20, it is possible to prevent an increase in the size and weight of the configuration of the speed reducer 20.

As described above, the above embodiments, and modifications of the present invention are merely examples of applications of the present invention, and the technical scope of the present invention is not limited to the specific configurations of the above embodiments.

In the embodiments described above, an electric vehicle that travels by driving the motor 10 by electric power of a battery has been described as an example, but the present invention is not limited thereto. The vehicle may be a series hybrid vehicle that includes an engine and drives the motor 10 by electric power generated by the engine.

The invention claimed is:

1. A drive device comprising:
    a housing; and
    a rotary electric machine and a transmission housed in the housing, wherein:
    the rotary electric machine comprises a rotor shaft;
    the housing comprises:
        an outer housing having a cylindrical space therein, the outer housing defining a transmission chamber,
        an inner housing located inside the outer housing, the inner housing defining a rotary electric machine chamber,
        wherein the transmission chamber is on an outer side of the inner housing along a direction of the rotor shaft;
    the rotary electric machine is accommodated in the rotary electric machine chamber and the transmission is accommodated in the transmission chamber;
    the outer housing comprises a partition wall that separates the transmission chamber from the inner housing;
    a refrigerant passage through which a refrigerant flows for cooling the rotary electric machine is formed in a space between the outer housing and the inner housing including a space between the inner housing and the partition wall;

a bottom portion of the outer housing is configured to store a lubricating oil and to allow the lubricating oil to be scooped by a gear of the transmission; and a storage portion configured to temporarily store the lubricating oil scooped up by the gear of the transmission is formed in the transmission chamber such that the storage portion and the refrigerant passage in the space between the inner housing and the partition wall face each other with the partition wall interposed therebetween.

2. The drive device according to claim 1, wherein:
the inner housing is fixed by a fixing portion inscribed in the outer housing in a vicinity of the partition wall; and
the refrigerant passage comprises:
  a first refrigerant passage formed between an inner periphery of the outer housing and an outer periphery of the inner housing,
  a second refrigerant passage formed in the space between the inner housing and the partition wall, and
  the first refrigerant passage and the second refrigerant passage communicate with each other through a communication hole formed in the fixing portion.

3. The drive device according to claim 1, wherein:
the storage portion comprises:
  a region defined by the partition wall, and
  a detent spring fixed to the partition wall; and
the transmission comprises a park mechanism for stopping rotation of the transmission, the park mechanism comprising the detent spring.

4. The drive device according to claim 1, wherein:
a partition plate that guides the lubricating oil scooped up by the gear is provided on a radially outer side of the gear in the transmission housing.

5. The drive device according to claim 1, wherein:
the partition wall comprises a rib configured to guide a flow of the lubricating oil in the transmission toward the storage portion.

* * * * *